Patented July 24, 1923.

1,463,123

UNITED STATES PATENT OFFICE.

FREDRICK J. McALLISTER, OF ELYRIA, OHIO, ASSIGNOR OF ONE-EIGHTH TO A. E. SIMMONS AND ONE-EIGHTH TO FRANK HENKE, BOTH OF ELYRIA, OHIO.

BUILDING-MATERIAL COMPOSITION.

No Drawing.   Application filed August 9, 1922.   Serial No. 580,760.

*To all whom it may concern:*

Be it known that I, FREDRICK J. MCALLISTER, a citizen of the United States, residing at Elyria, in the county of Lorain and State of Ohio, have invented a new and useful Building-Material Composition, of which the following is a specification.

The present invention is a composition of subject matter which may be used as a coating or wall-plaster or made in blocks, bricks or slabs for building purposes. The composition, however, is not limited to the purposes just mentioned, but is susceptible to various other general uses.

The prime object of this invention is to produce a composition of matter which can be substituted for wood, steel, terra-cotta, tile or ordinary bricks, which is extremely strong and durable possessing high tensile strength, which is water-proof and fire-proof, which is a non-conductor of heat and electricity, which possesses the requisite resiliency and elasticity to receive nails, tacks, screws or the like when driven into the same without splitting, breaking, chipping or tearing the composition, and which can be worked with the same facility as wood, while at the same time being lighter in weight and having the same tensile strength as similar materials now on the market.

The drawback of similar materials which have been proposed and marketed is that they include and use expensive ingredients and large proportions of cement, resulting in the product being much heavier in weight, more brittle, and possessing no better fire and water proofing qualities or resiliency or elasticity to receive nails, screws and the like.

One of the prime objects of this invention is to use ingredients which are readily obtainable and are ordinarily regarded as waste and which are very cheap.

The composition of material which forms this invention and which I call "Egyptson," consists of the following ingredients:—

Wood pulp, sawdust or ground paper; silicious material, (such as diatomaceous earth, fine sand or ground cinders); cement or calcined gypsum; hydrated lime or plaster of Paris; and alum. Coloring matter may be added to the mixture, as desired, to produce the desired colors or tints thereto. If gypsum is used instead of cement, plaster of Paris is not used as a substitute for lime.

It is found that the best results are obtained for general uses when the above ingredients are mixed in the following proportions:—

| | Per cent. |
|---|---|
| Wood pulp, sawdust or ground paper | 40 |
| Silicious material | 20 |
| Cement (preferably Portland) or gypsum | 30 |
| Hydrated lime or plaster of Paris | 9 |
| Alum (aluminum sulfate) | 1 |

Water being added as required to thoroughly mix the contents to a paste consistency.

The above is the preferred aggregation and proportions of ingredients for the composition of this invention, but it is found that sodium-silicate can be included in the mixture for the purpose of adding to the fire proof properties of the product. When the sodium-silicate is used, it is preferred to mix with it, in molecular proportions, magnesium chloride to render it insoluble in water or fixed, thus further improving the fire-proof properties of the product.

The process followed in mixing the ingredients of the material is—

(1) Placing the wood pulp, sawdust or ground paper in a suitable receptacle or mixing chamber and adding sufficient water to well saturate the material; (2) Add the alum to the saturating water, and in the instances where sodium-silicate and magnesium chloride is used they are also added with the alum; (3) Mix the silicious material, cement and lime together in a dry state, passing the same through screens and rollers to produce a thorough mechanical mixture; (4) Add the mixture of silicious material, cement and lime to the saturated pulp and adding such additional quantities of water as may be required to bring about a paste consistency.

The composition thus produced, can be used as a coating, a plaster or can be made in block, brick or slab form for general building purposes and constructions of all kinds to replace wood, stone, brick, tile, concrete, plaster and steel in number of instances. The blocks or bricks made from this composition, as well as when it is used in a plaster form, do not require kiln-drying but can be left open to the atmosphere which rapidly dries the composition of its excess moisture. After four hours the bricks or blocks are hard enough to be handled, and after seventy-two hours can be worked.

This composition has a decided advantage over similar compositions in that asbestos fibre and large quantities of cement are not used or required to produce a durable and efficient product, thus clearly reducing the cost. The fireproofing properties of the composition are obtained by the use of lime and alum. When the lime is mixed with the water, the lime-water or whey resulting burns into the wood, paper or pulp and is the vehicle by which the alum is carried into the wood to thoroughly penetrate the same, the alum fireproofing the wood against ordinary temperatures. In such instances when sodium silicate is used, magnesium chloride is added which renders the latter insoluble. The sodium silicate is carried into the wood by the lime in the same manner as the alum. It will thus be seen that asbestos material can be eliminated from the composition with a great saving in cost.

Furthermore, the lime functions as a precipitant or coagulating agent, and in the finished product improves the hardening and binding properties of the cement.

The wood pulp, sawdust or ground paper is used as a light filler body to give the composition lightness in weight and, when hardened, the requisite resiliency and elasticity permitting nails, screws, and the like to be driven in the composition without breaking, cracking, chipping or otherwise injuring the block, brick, or slab of the composition. It has been found that the nails, screws or other devices driven into the composition will sustain greater pressure or pull than most of the commonly used woods. And, the further advantage of the composition is that it is less expensive to use than wood and at the same time possesses the qualities of being fire proof, water proof, but of the same workable qualities as wood.

The alum and lime facilitates the quick setting of the cement while the wood pulp, saw-dust, and ground paper act as a retardant to insure proper and thorough setting and hardening of the binding elements of the composition.

The alum and lime, furthermore, produce an alkaline solution in composition, which penetrates the latter, and renders the composition non-injurious to metals in common use in building and with which it may contact.

While the above formula gives the preferred ingredients and proportions of the mixture, the same may be varied in the following manner without losing entirely the characteristics and properties of the finished product made in conformance with the preferred formula, which may be varied as follows:—

|  | Per cent. |
|---|---|
| Sawdust, wood pulp or ground paper | 30 to 50 |
| Cement or gypsum | 25 to 35 |
| Lime | 5 to 10 |
| Alum | 1 to 5 |
| Cinders | 5 to 20 |
| Sand | 4 to 10 |

For specific formulæ which have been experimented with and produced good results, the following are given:—

|  | Per cent. |
|---|---|
| Sawdust, wood pulp or ground paper | 45 |
| Cement or gypsum (calcined) | 25 |
| Lime | 10 |
| Alum | 05 |
| Sand | 10 |

Also:—

|  | Per cent. |
|---|---|
| Sawdust, wood pulp or ground paper | 30 |
| Cement or gypsum | 30 |
| Lime | 09 |
| Alum | 01 |
| Sand | 10 |
| Cinders | 10 |
| Sodium-silicate and magnesium chloride (in molecular quantities) | 10 |

And also:—

|  | Per cent. |
|---|---|
| Sawdust, wood pulp or paper | 30 |
| Cement or gypsum | 30 |
| Lime | 9 |
| Alum | 1 |
| Sand | 10 |
| Cinders | 20 |

It is obvious that the proportions of the ingredients of this composition may vary in accordance with the above formulæ and that the invention is only to be limited by the claims hereto appended and the prior state of the art.

The product produced by this composition of matter can be used for general building purposes as a substitute for wood, stone, brick, tile, cement, plaster, etc., and can be used for walls, flooring, shingles or roofing, either in a monolithic form or in blocks. The product is highly fireproof, waterproof, can be worked the same as wood, will receive nails, screws and the like and is very hard and durable, having great tensile strength, resilient and elastic to a degree, while at the same time, being extremely economical in production compared with similar products and materials susceptible to the same uses as the present material.

In the present composition very cheap ingredients are used and the proportions are such that wool pulp, sawdust, or ground paper form the greatest bulk of any single ingredient and that the requisite amount of cement is very small comparatively.

Throughout the claims the term fibrous material is to include wood-pulp, saw-dust, ground paper, straw, or any other fibrous material, and the term hydraulic settable cement to include either Portland cement or gypsum, or any other cementitious binder which will set in presence of moisture.

What I claim and desire to secure by Letters Patent, is:—

1. A composition of matter comprising a fibrous material, 30 to 50 per cent; hydraulic settable cement, 25 to 35 per cent; lime, 5 to 10 per cent; alum, 1 to 5 per cent, and silicious material, 4 to 35 per cent.

2. A composition of matter comprising a fibrous material, 30 to 50 per cent; hydraulic settable cement, 25 to 35 per cent; lime, 5 to 10 per cent; alum, 1 to 5 per cent; silicious material, 4 to 35 per cent, and an admixture of sodium-silicate and magnesium chloride in molecular proportions.

3. A composition of matter comprising a combustible fibrous material 30 to 50 per cent; Portland cement, 25 to 35 per cent; hydrated lime, 5 to 10 per cent; alum, 1 to 5 per cent; silicious material 4 to 35 per cent.

4. A composition of matter comprising a combustible fibrous material 30 to 50 per cent; Portland cement, 25 to 35 per cent; hydrated lime, 5 to 10 per cent; alum, 1 to 5 per cent; silicious material 4 to 35 per cent; and admixture of sodium-silicate and magnesium chloride in molecular proportions.

In testimony whereof I have hereunto set my hand.

FREDRICK J. McALLISTER.